July 21, 1931.  S. E. HITT  1,815,103
CABIN FOR AIR AND WATER CRAFT
Filed March 5, 1931   9 Sheets-Sheet 1

WITNESSES:
Earle E. Weller
Jay G. Upp

INVENTOR
Samuel E. Hitt

July 21, 1931.　　　S. E. HITT　　　1,815,103
CABIN FOR AIR AND WATER CRAFT
Filed March 5, 1931　　9 Sheets-Sheet 2

Fig. 3

WITNESSES:
Earle E. Weller
Jay G. Upp

INVENTOR
Samuel E. Hitt

July 21, 1931.     S. E. HITT     1,815,103
CABIN FOR AIR AND WATER CRAFT
Filed March 5, 1931     9 Sheets-Sheet 4

July 21, 1931.    S. E. HITT    1,815,103
CABIN FOR AIR AND WATER CRAFT
Filed March 5, 1931    9 Sheets-Sheet 5

WITNESSES:
Earle E. Weller
Jay G. Upp

INVENTOR
Samuel E. Hitt

July 21, 1931. S. E. HITT 1,815,103
CABIN FOR AIR AND WATER CRAFT
Filed March 5, 1931 9 Sheets-Sheet 6

INVENTOR
Samuel E. Hitt

WITNESSES:
Earle E. Weller
Jay G. Upp

Patented July 21, 1931

1,815,103

UNITED STATES PATENT OFFICE

SAMUEL E. HITT, OF ELYRIA, OHIO

CABIN FOR AIR AND WATER CRAFT

Application filed March 5, 1931. Serial No. 520,284.

My improvement consists of cabins for my aero-plane-ship, (hereinafter called aeroship), an aero-hyro-glider, a sea going vessel with two hulls and lifting aeroplanes which at high speed glides over the surface of the water or skips upon the crests of waves as described and illustrated in my applications, Air and water craft, Serial No. 264,634, filed March 26th, 1928, Propeller turret for propulsion and steering of aeroships, Serial No. 385,238, filed June 27, 1929, Hull unit for air and water craft, Serial No. 442,576, filed April 8th, 1930, and others.

In my aeroship, the two hulls are reinforced by truss members extending their entire length and as the hulls are of small section, each of the hull units carries cabins on both sides to balance the loading.

My aeroship is constructed for safety, so as to be able to come to and ride out a storm if necessary. The two hulls are of honeycomb construction, practically non-sinkable under ordinary conditions, both hulls having superstructures which carry safety and auxiliary floats, so that in case the hulls start to break up in a rough sea and the aeroship settles further in the water, the floats add buoyancy and keep the aeroship afloat.

The safety floats are at two elevations, the first series five or six feet above the hulls and the second series about ten feet higher.

My present improvement consists in cabins adapted to serve the purpose of carrying passengers, mail and express, and to fulfill the further purpose of providing additional floats in case of a disaster when the hulls and both series of safety floats become immersed.

An object of my invention is to provide my aeroship with water tight cabins at two elevations so that the upper cabins become the fourth series of floats above the hulls.

An object of my invention is to provide the upper series of cabins equipped for passengers, each cabin to be separately enclosable and capable of water tight closure.

An object of my invention is to provide a number of cabins in the upper series on both sides of each hull connected by stairways with one long cabin underneath on both sides of each hull.

An object of my invention is to provide the long lower cabin with universal joints to relieve the cabin shell or tube from strains sustained by the supporting framework.

An object of my invention is to provide the long lower cabin with expansion joints, to relieve the cabin shell or tube from either structural strains or those due to variable temperature.

An object of my invention is to provide the long lower cabins with partitions, dividing the lower cabin into as many sections as there are cabins above them.

An object of my invention is to provide the lower cabin partitions with doors capable of water tight closure.

An object of my invention is to provide a floor door closure for the stairway openings into the upper cabins of such construction that it can readily be made water tight, should danger threaten.

An object of my invention is to provide a floor door of car construction, opened and closed ordinarily by an electric motor, so that it can be kept closed and opened only when someone desires to enter or leave one of the upper cabins.

An object of my invention is to provide manual operation of the floor door in case the electric motor is out of commission.

An object of my invention is to provide water tight gaskets for the floor door closure.

An object of my invention is to provide a number of hand wheels for water tight closure for the floor door when in place covering the stairway opening.

An object of my invention is to provide the cabins with water tight windows or port holes.

An object of my invention is to provide the lower cabin with a water tight door for entrance and exit.

An object of my invention is to provide platforms and stairways of perforated construction from lower cabin exists to lower deck level for boarding or landing of passengers.

An object of my invention is to provide an electric elevator of perforated construction, from lower cabin exits to lower deck level to save the climb of three flights of stairs on boarding.

An object of my invention is to provide the cabins with means of ventilation and means for closure of same in case the cabins get down to water level.

Figure 3:
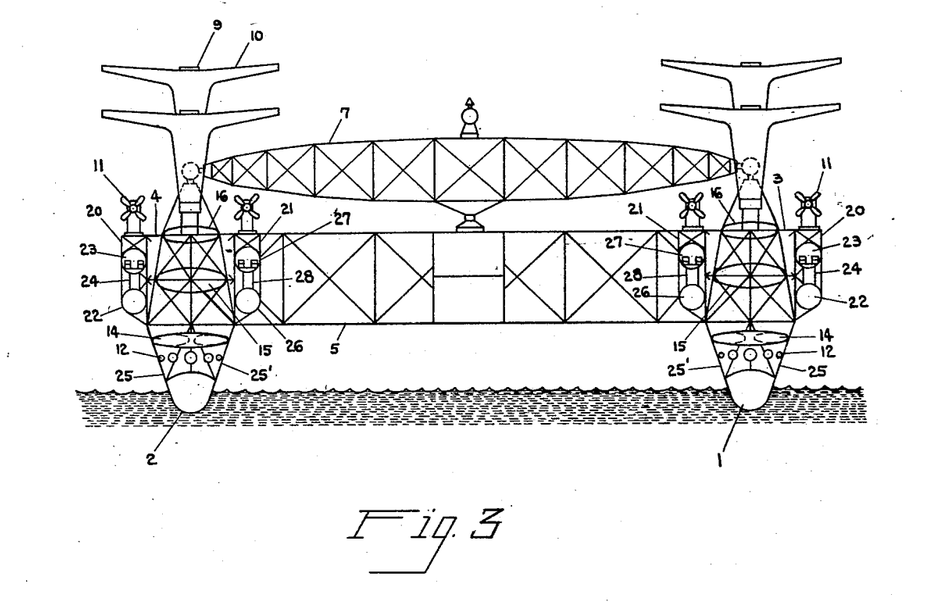
Fig. 3 is an end view of the aeroship, with cabins in section on line 3—3 of Fig. 1.
Figure 4:
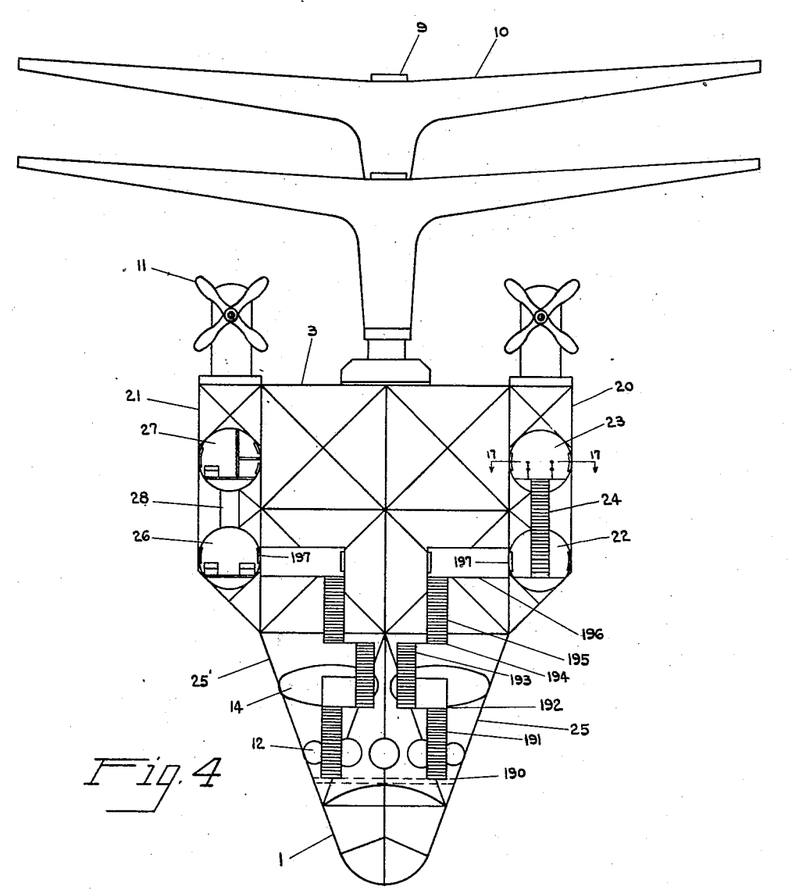
Fig. 4 is a vertical section of one hull unit on line 4—4 of Fig. 2.

*Numerals.*—In my two hull aeroship, as shown in Fig. 3—1 is the port hull and 2 the starboard hull, reinforced by truss members 3 and 4 and connected by bridges 5 and spanners 7 as explained in previous patents.

9 are masts carrying lifting planes 10. 11 are propeller units, 12 is the lower series of safety floats, 14 is the upper series of safety floats, 15 is an auxiliary float and 16 is the upper auxiliary float as explained in previous applications referred to above.

The truss member 3 is mounted on hull 1 by the intermediate framing 25—25'.

The three elements, hull 1, truss member 3 and the intermediate framing 25—25' form a beam stiff enough to carry their load and span from crest to crest of the longest waves encountered.

The truss member 3 carries bracket members 20 and 21 for support of the turret propeller units 11 and the cabins 22, 23, 26 and 27.

Bracket member 20 carries the long lower cabin 22 and eight upper cabins 23, reached by stairways 24.

Bracket member 21 carries the long lower cabin 26 and six upper cabins 27 reached by stairways 28.

Figure 1:
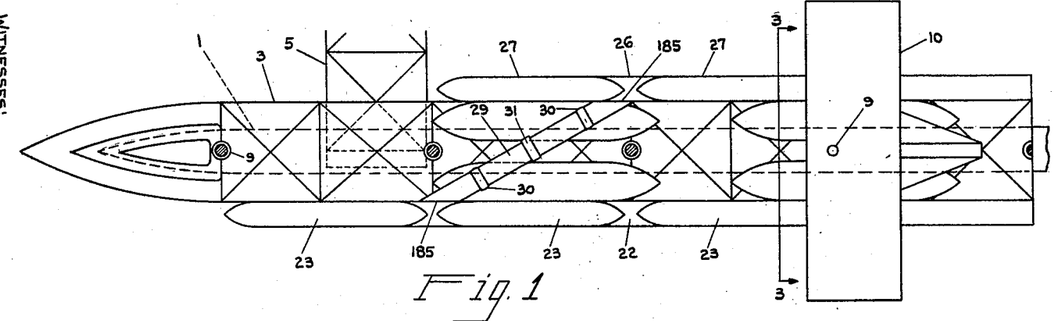
Fig. 1 is a half plan of a hull unit.

In each hull unit, 1 and 2, the outer lower cabin 22 is connected to the inner lower cabin 26 by a cross passageway 29 at an angle of 30 degrees to the longitudinal axis of the hull to reduce air resistance to a minimum as shown in Fig. 1.

The lower cabins 22 and 26 are provided with door openings 185, into the cross passageway 29, the doors arranged for water tight closure in case of danger or mishap.

The hull units 1 and 2 are each provided with three of these cross passageways 29.

Figure 2:
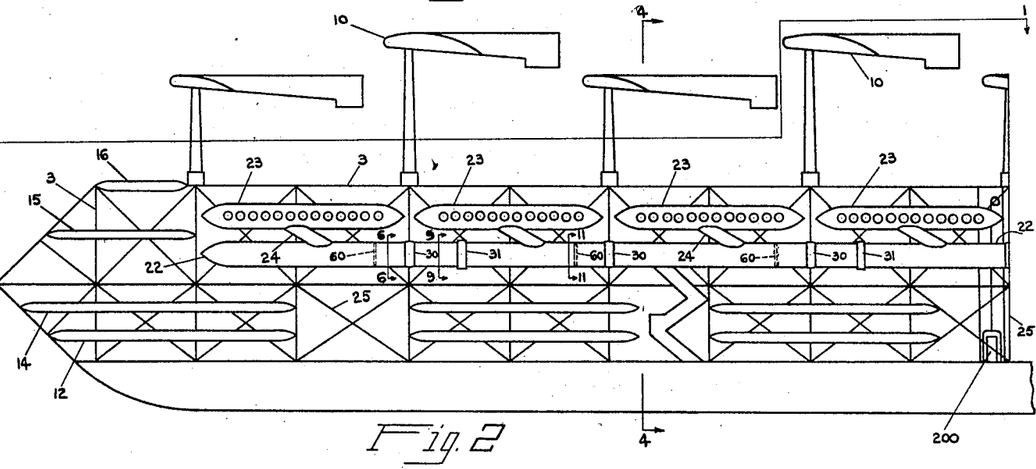
Fig. 2 is a half elevation of a hull unit.
Figures 5, 6, 7, 8, 9, 10:
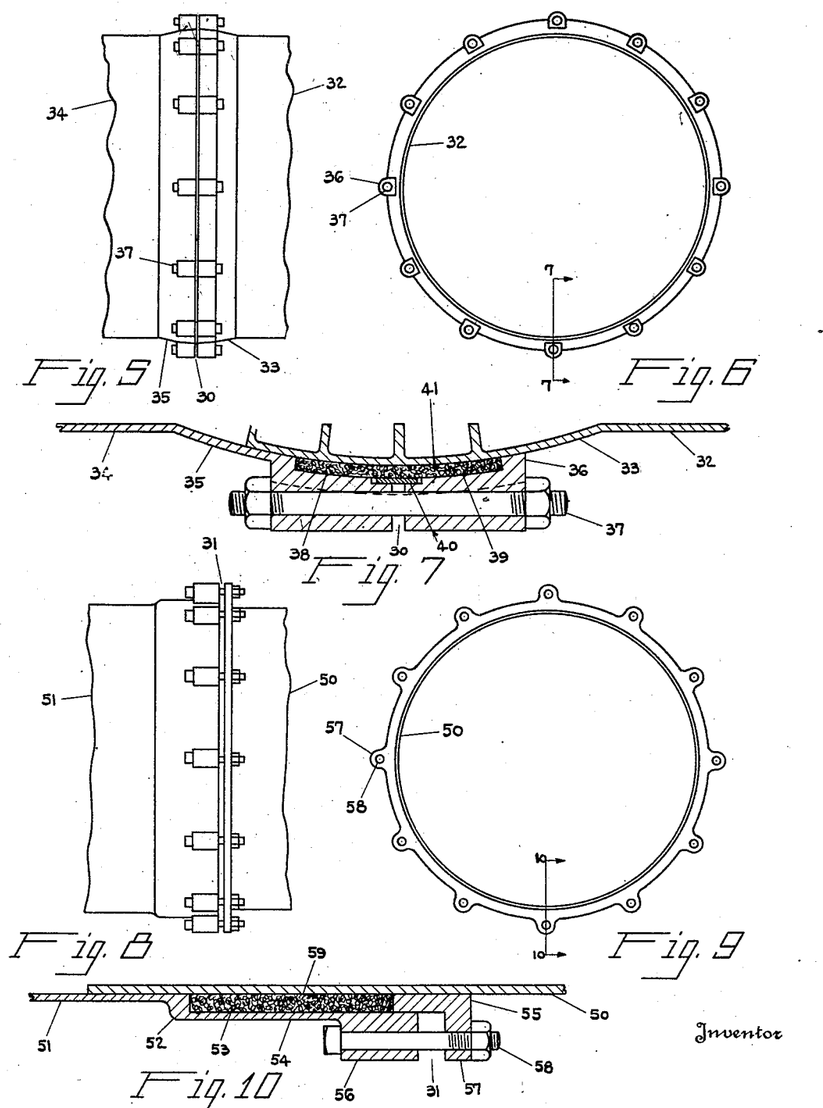
Fig. 5 is a side elevation of the cabin tube universal joint.
Fig. 6 is a vertical section on line 6—6 of Fig. 2.
Fig. 7 is a section on line 7—7 of Fig. 6.
Fig. 8 is a side view of the cabin tube expansion joint.
Fig. 9 is a vertical section on line 9—9 of Fig. 2.
Fig. 10 is a section on line 10—10 of Fig. 9.

The lower cabins 22 and 26 and the passageways 29 are all provided with universal joints 30 as shown in Figs. 1 and 2 and in more detail in Figs. 5, 6 and 7, and also with expansion joints 31 shown in Figs. 1 and 2 and in more detail in Figs. 8, 9 and 10.

The upper cabins 23 and 27 and the lower cabins 22 and 26 are all of tubular form, now planned ten feet in diameter.

As shown in Figs. 5, 6 and 7, the end of cabin tube 32 is of spherical form 33, radial from a center in the longitudinal axis of the cabin tube.

The adjacent cabin tube section 34 is enlarged in spherical form 35 to fit over the spherical end 33 of the cabin tube end 32 and extends nearly to the central plane of the universal joint 30.

The spherical gland 36 is made in halves which bolt together and also fit over the spherical end 33 of the tube 32 and is secured to the spherical end 35 by the bolts 37.

The universal joint 30 is made water tight by the stuffing box formed by recess 38 in the end 35 and recess 39 in the gland 36. The joint between the tube end 35 and gland 36 is closed by the ring plate 40.

The spherical chamber thus formed is filled with packing 41 of absorbent material so that in case the cabin tubes get down to sea level, the cabin tubes becoming partly submerged and water reaching the joint, the packing 41 will expand enough to render the joint 30 water tight, even if not sufficiently tight when dry.

As shown in Figs. 8, 9, and 10, the lower cabin tubes 22 and 26 are further protected against rupture by the expansion joints 31 in which, on one side of the joint 31, the cabin tube has a plain end 50 and on the other side of the joint 31, the cabin tube 51 is belled at 52 to form the chamber 53 for the stuffing box 54. The gland 55 forms an adjustable closure for the chamber 53, the belled end 52 carrying lugs 56 and the gland 55 carrying lugs 57 for the gland bolts 58. The chamber 53 is filled with packing 59. The cabin tube end 51 is free to move in and out longitudinally over the cabin tube end 50, the telescope joint thus formed being rendered water tight by the stuffing box 54.

Rigid mounting of cabins on the superstructure, i. e.: truss members 3 and 4 and brackets 20 and 21, is necessary on account of strains due to head air resistance and drag and also skin resistance of the air when the aeroship is at high speed.

The upper cabins 23 and 27 are comparatively short, having few supports and can be safely mounted. The lower cabins 22 and 26 are very long and are subjected to strains due to bending and twisting of the truss members 3 and 4.

By means of the spherical joints 30 and the expansion joints 31, the hull superstructure, 3—25—25'—20—21, can deflect within its elastic limit without causing any damage to the lower cabins 22 and 26, by reason of the relief offered by the spherical joint 30 and the expansion joint 31.

In case of disaster and the truss member 3 buckles, the expansion joint 31 might possibly pull out, allowing the lower cabin 22 to flood.

The lower cabins 22 and 26 are therefore provided with a number of partitions 60, dividing the cabin tubes 22 and 26, in as many sections as there are upper cabins 23 and 27 above them, 6 sections for the inside cabins 26 and 8 sections for the outside cabins 22, so that in case the lower cabin tube 22 fails, for instance, at any one point and the tube 22 is partly submerged, that one section only will be flooded.

The cabin partitions 60 are provided with flexible doors 61 capable of water closure as shown in Figs. 11, 12, 13, 14, 15 and 16.

Figures 11, 12, 13:
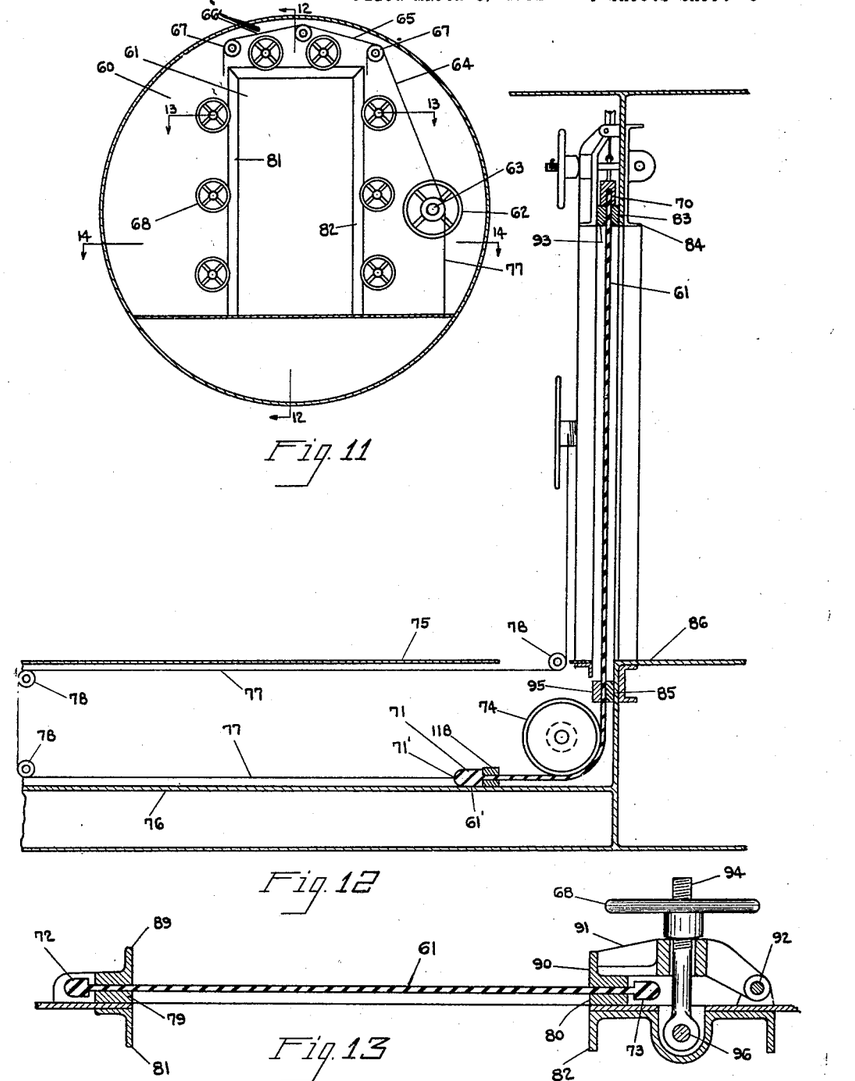
Fig. 11 is a section of lower cabin tube on line 11—11 of Fig. 2, showing partition door.
Fig. 12 is a longitudinal vertical section through the partition door on line 12—12 of Fig. 11.
Fig. 13 is a part sectional plan on line 13—13 of Fig. 11.

As shown in Fig. 11, the door 61 is closed by the hand wheel 62 operating the rope drum 63 and wire ropes 64, 65 and 66 running on sheaves 67.

Water closure of the door 61 is effected by the hand wheels 68.

As shown in Figs. 12 and 13, the outer edges of the flexible door 61 are bound with reinforcing strips, 70 at the top and 71 at the bottom end, of rigid material on account of the rope fastenings.

The side bindings 72 and 73 are of flexible material so that the door 61 can run over the drum 74 and disappear under the floor 75. When the door 61 is open, the part 61' under the floor 75, rests on the sub-floor 76.

The door 61 is opened by the wire ropes 77 running on sheaves 78 and fastened to door 61 at 71'.

The flexible door 61 is made wide enough so that the side bindings 72 and 73 fall outside of the lock strips 79 and 80 secured to the door jambs 81 and 82.

Likewise, lock strip 83 is secured to the door lintel 84 and bar 85 is secured to the door sill 86.

Water closure of the door 61 is effected by pressure of clamp bars 89 against lock strip 79, clamp bar 90 against lock strip 80, clamp bar 93 against lock strip 83 and clamp bar 95 against bar 85.

As shown in Fig. 13, bars 89 and 90 are carried by levers 91, pivoted at 92 and clamp down by hand wheels 68 turning upon the bolts 94 pivoted as at 96.

Similar apparatus is provided at the top of the door 61.

When the partition door 61 is closed, and in its "up" position ready for water closure, the lower end binding 71 reaches the stop 118 so that, in case the cabin tube 22 floods on one side of the partition 60 causing the flexible door 61 to bulge, the sides and ends of the door will have a tendency to draw in, and the bottom end binding 71 will be held against the pull by the stop 118, relieving the door sill clamping device of that strain.

Figures 14, 15:
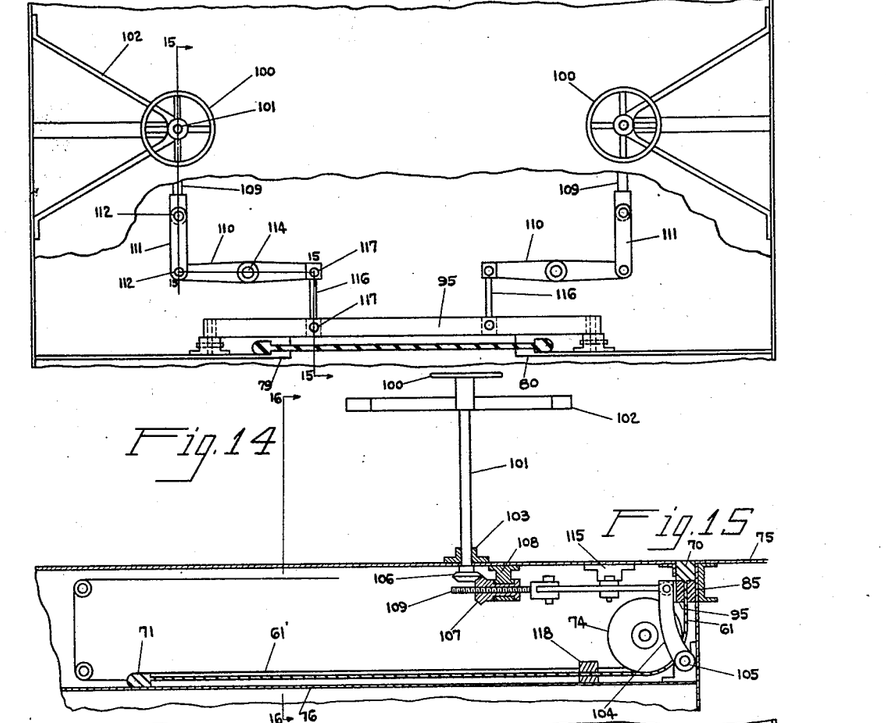
Fig. 14 is a part sectional plan showing sill closure for the partition door, on line 14—14 of Fig. 11.
Fig. 15 is a sectional elevation on line 15—15—15—15 of Fig. 14.
Figure 16:
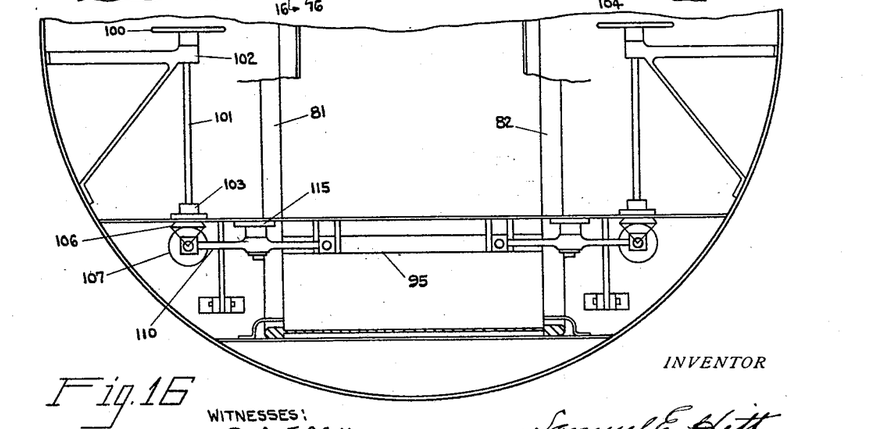
Fig. 16 is a part cross section of lower cabin tube and partition door on line 16—16 of Fig. 15.

As shown in Figs. 14, 15 and 16, water closure at the door sill is effected by operation of the hand wheels 100 carried by shaft 101 turning in brackets 102 and floor bearings 103.

Clamp bar 95 is carried by the arms 104, hinged at 105.

The bar 95 is pressed against the door 61 and the bar 85 by hand wheels 100 operating through shafts 101, bevel gears 106 and 107 running in bearings 108 and threaded for eye bolts 109 connected to levers 110 by links 111 and pins 112.

The levers 110 are pivoted at 114 on floor brackets 115 and connected to clamp bars 95 by links 116 and pins 117.

In Fig. 15, the door is shown in its down position to show the top binding 70 to be level with the floor 75 and filling the door slot.

When the door 61 is up, i. e.: closed, water closure is effected by clockwise movement of all handwheels 68 and 100 and door 61 is released from water closure and made ready for opening by turning the handwheels 68 and 100 counterclockwise.

In Figs. 17, 18 and 19, 120 is the stairway opening protected by hand rails 121 and closed by the floor door 122.

Figure 17:
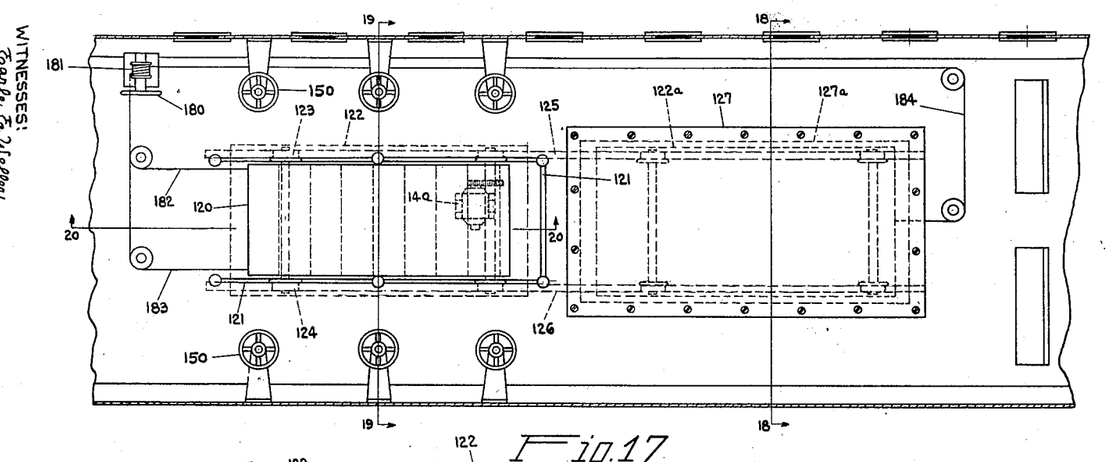
Fig. 17 is a part sectional plan on line 17—17 of Fig. 4.
Figure 18:
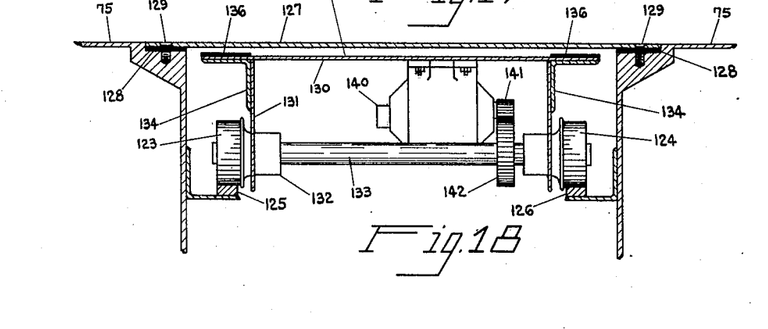
Fig. 18 is a sectional elevation on line 18—18 of Fig. 17.
Figure 19:
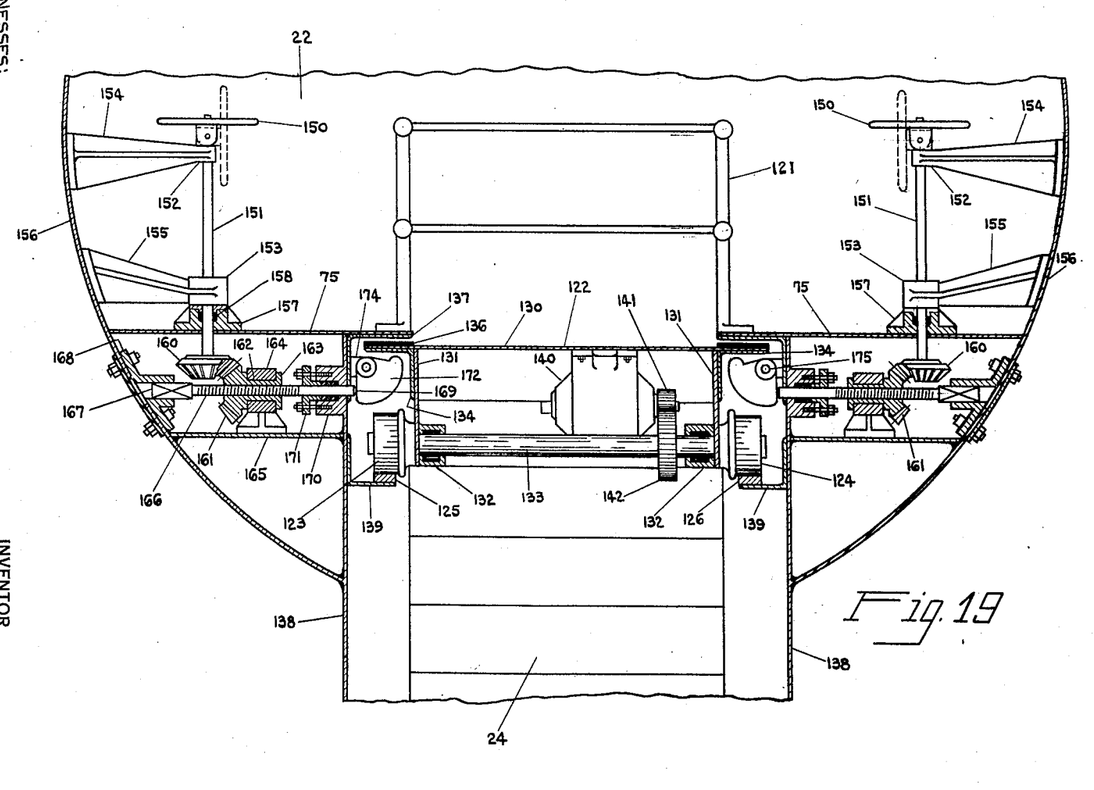
Fig. 19 is a part section of upper cabin on line 19—19 of Fig. 17.

The floor door 122 is mounted on wheels 123 and 124 which run on the track 125—126 which extends far enough under the floor 75 so that the floor door 122 can be run back under the floor to the position 122a under the removable floor plate 127, where it is accessible for adjustment and repair.

The floor plate opening 127a is made water tight by means of the gasket 128 and fastening screws 129 as shown in Fig. 18.

In Fig. 19, the floor door 122 is shown to consist of a top plate 130, frame 131, bearings 132, axles 133, track wheels 123—124 and angle brackets 134 which support the top plate 130 where it projects under the floor 75.

Gaskets 136 are carried by the floor plate 130 over the brackets 134 and under the cabin floor 75 so that when the floor door 122 is raised, the gaskets 136 effect a water tight closure of the door 122.

The overhang of the floor plates 75 is carried by bracket angles 137 supported by the side plates 138 of the stairway tube 24.

The track bars 125—126 are supported by bracket angles 139 carried by the side plates 138.

Under ordinary running conditions the floor door 122 is opened and closed by the electric motor 140, which drives the axles 133 through the gears 141 and 142.

There is clearance between the floor door gasket 136 and the floor bracket angle 137, so that the floor door 122 can run back and forth freely on the track 125—126.

Figure 20:
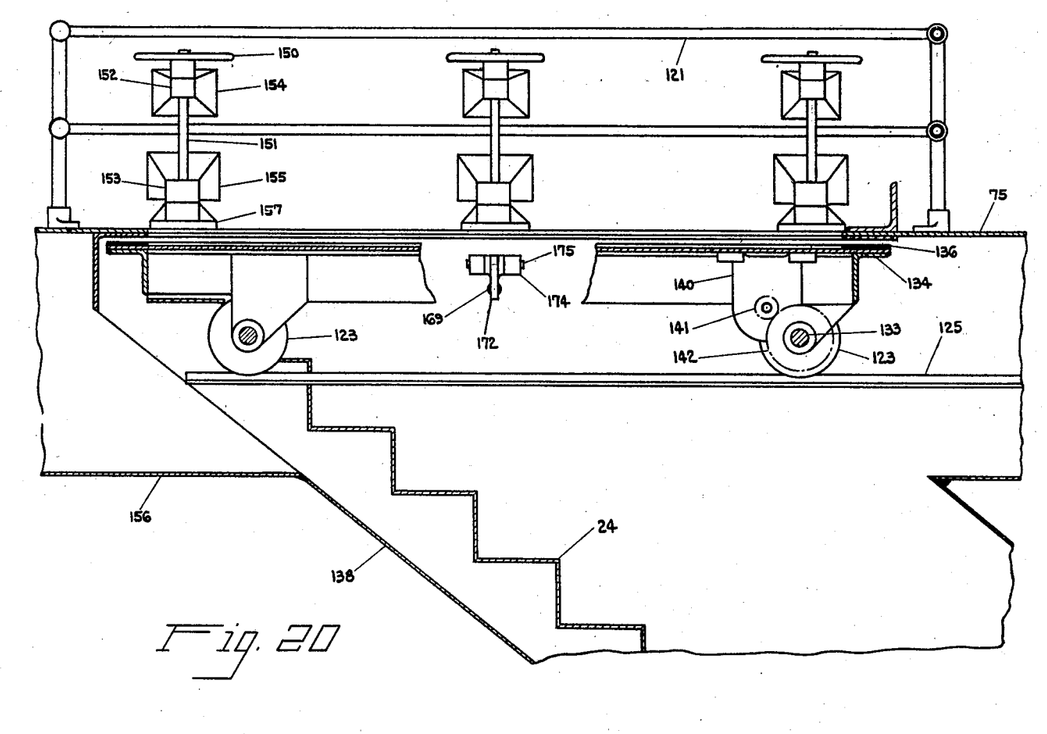
Fig. 20 is a sectional elevation on line 20—20 of Fig. 17.

When the floor door 122 is covering the stairway opening 120 as shown in Figs. 17, 19 and 20, and it is desired to make water tight closure, the floor door 122 is raised and pressed against the floor bracket angles 137 by operation of the hand wheels 150 mounted on vertical shafts 151 running in bearings 152 and 153 carried by brackets 154 and 155 mounted on the cabin tube 156. The shafts 151 pass through bearings 157 mounted on the floor 75, which are provided with stuffing boxes 158 for closure.

At their lower ends, the shafts 151 carry bevel gears 160 which engage the bevel gears 161 having sleeves 162 and flanges 163 to run in bearings 164 mounted on the sub-floor 165.

The bevel gears 161 are tapped for the threaded rods 166 which have square ends 167 and which are prevented from turning by a sliding fit in the square openings of the brackets 168 mounted on the cabin tube 156.

The threaded rods 166 have plane ends 169 of smaller diameter than that of the threaded portion and projecting through the stuffing box 170 and gland 171 into the stairway opening 120, engaging the bell cranks 172 mounted with brackets 174 and pins 175 on the side plates 138 of the stairway tube 24.

The bell cranks 172 are ordinarily left down in the position shown to leave clearance for the bracket angles 134, thus allowing the floor door 122 to be moved back and forth without interference.

When it is desired to effect water tight closure of the floor door 122, the floor door 122 is moved into place, closing the opening 120 over the stairs 24, either by the operation of the motor 140 or by the handwheel 180, windlass 181, and cables 182 and 183 as shown in Fig. 17.

The handwheels 150 are turned clockwise and through the shafts 151 and gears 160 and 161 the threaded rods 166 are moved inwardly against the bell cranks 172, causing the bell cranks 172 to swing about the pins 175 until contact is made with the bracket angles 134 on the floor door 122.

Further turning of the handwheel 150 raises the floor door 122 until the gaskets 136 come in contact with the bracket angles 137 under the floor 75.

Still further turning of the handwheels 150 and further raising of the floor door 122 compresses the gasket 136 until the joint between the floor door 122 and the cabin floor 75 becomes water tight.

To release the floor door 122 so that it can be opened, the handwheels 150 are turned counterclockwise, causing the threaded rods 166 to move outwardly, removing the pressure from the bell cranks 172, when the floor door 122 settles down on the track 125—126 from its own weight, and can then be run back under the floor plate 127 by the motor 140 or by the handwheel 180, windlass 181 and cable 184.

Furthermore, in case of mishap, the upper and lower cabins with the second series of floats 14, altogether have sufficient buoyancy to float my aeroship and its load and thereby prevent a disaster.

Furthermore in case of danger and the safety doors are sealed for water closure, in case of mishap and the doors are put to test and leak some, all of the upper cabins are provided with hand pumps and all sections of the lower cabins with both power and hand pumps.

The cabins on one side of a hull, as the outer cabins 22 and 23, in addition to the seating capacity are completely equipped with smoking and lounging rooms, barber shop, baths, dining room and sleeping apartments and every possible convenience so that the cross passageways 29 are not used except by officers and crew or in case of emergency, the doors 185 left closed and sealed to reduce the hazard of unequal loading to a minimum.

The doors 185, leading from the inner cabins 26 to the cross passageways 29, and the outside cabin doors 197 leading from the outer cabins 22 to the platforms 196, are the same as the flexible doors 61 shown in Figs. 11, 12, 13, 14, 15 and 16, and disappear under the floor.

My two hulls are the same as illustrated in previous applications, and can best be described as consisting of two hull units, the hull unit comprising a long narrow fan shaped hull reinforced by a compound truss consisting of the truss proper and intermediate framing between the hull and the truss proper, and in which the fan shaped sides of the hull lay in the planes of the outer sides of the intermediate framing.

*Operation.*—Passengers board my aeroship at the lower platform 190 above the hull and reach the lower cabins 22 and 26 either by the electric elevator 200 or by the stairs 191, landing 192, stairs 193, landing 194, stairs 195, landing 196 and enter cabins 22 or 26 by doors 197, which are then made water tight and my aeroship goes to sea.

First class passengers are assigned to the upper cabins 23 and 27 and second class passengers to the lower cabins 22 and 26.

On leaving port, the partition doors 61 of the lower cabins 22 and 26 and the floor doors 122 of the upper cabins 23 and 27 are all manned and closed to passage.

Should my aeroship encounter bad weather and it becomes necessary to slow down and possibly come to and ride out a storm, then all passengers are ordered to the upper cabins, all partition doors and floor doors are closed and sealed, i. e.: made water tight, and kept so until danger has passed.

When the storm is over and my aeroship is under way, the safety doors are opened for free passage, but closed again when nearing port if the sea runs high, the hazard increasing as the hulls settle further in the water.

On reaching port, the passengers disembark as they entered, using the elevator 200 or stairways 191—193—195.

Some alterations may be necessary in the cabins on account of changes to be made in the wing mounting, which can be done without departing from the spirit and scope of my invention.

Claims:

1. In a two hull unit aeroship or similar craft, the said hull unit consisting of an entirely enclosed hull reinforced by a compound truss composed of a truss proper and intermediate framing between the said hull and the said truss proper, bracket members overhanging both sides of the said truss proper and enclosed cabins of tubular formation mounted on the said bracket members parallel to and equidistant from the vertical central plane of the said hull unit, substantially as specified.

2. In a two hull unit aeroship or similar craft, the said hull unit consisting of an entirely enclosed hull reinforced by a compound truss composed of a truss proper and intermediate framing between the said hull and the said truss proper, enclosed cabins of tubular formation mounted on the inner and outer sides of the said truss proper and means of water closure for the said enclosed cabins, substantially as specified.

3. In a two hull unit aeroship or similar craft, the said hull unit consisting of an entirely enclosed hull reinforced by a compound truss composed of a truss proper and intermediate framing between the said hull and the said truss proper, enclosed cabins mounted on the inner and outer sides of the said truss proper disposed at two elevations above the said hull, and means of water closure of the said enclosed cabins substantially as specified.

4. In a two hull unit aeroship or similar craft, the said hull unit consisting of an entirely enclosed hull reinforced by a compound truss composed of a truss proper and intermediate framing between the said hull and the said truss proper, a first series of floats of cylindrical formation carried by the said intermediate framing disposed above the said hull, a second series of floats of ovaloid formation carried by the said intermediate framing disposed above the first series of floats, enclosed cabins of tubular formations mounted on the inner and outer sides of the said truss proper disposed at two elevations above the said second series of floats, and means of water closure of the said enclosed cabins, substantially as specified.

5. In a two hull unit aeroship or similar craft, the said hull unit consisting of an entirely enclosed hull reinforced by a compound truss composed of a truss proper and intermediate framing between the said hull and the said truss proper, enclosed cabins mounted on the said truss proper, disposed on opposite sides of the said hull unit, enclosed cross passageways of tubular formation connecting the said oppositely disposed cabins, and means of water closure between the said cross passageways and the said oppositely disposed cabins, substantially as specified.

6. In a two hull unit aeroship or similar craft, the said hull unit consisting of an entirely enclosed hull reinforced by a compound truss composed of a truss proper and intermediate framing between the said hull and the said truss proper, enclosed cabins mounted on the said truss proper, stairways of open construction leading from the lower deck to the top platform, doors in the said cabins opening upon the said platform and means of water closure of said doors, substantially as specified.

7. In a two hull unit aeroship or similar craft, the said hull unit consisting of an entirely enclosed hull reinforced by a compound truss composed of a truss proper and intermediate framing between the said hull and the said truss proper, enclosed cabins mounted on the said truss proper, elevators of open construction leading from the lower deck to the top platform, doors in the said cabins opening upon the said platform and means of water closure of the said doors, substantially as specified.

8. In a two hull unit aeroship or similar craft, an enclosed cabin of tubular formation carried by the said hull unit, an expansion joint for the said tube consisting of a telescoping arrangement in which a cabin tube plain end engages a cabin tube belled end, and means of water closure of the said expansion joint consisting of a stuffing box construction for the said cabin tube belled end, substantially as specified.

9. In a two hull aeroship or similar craft, an enclosed cabin of tubular formation, a universal joint for the said cabin tube, the said universal joint consisting of an inner cabin tube end enlarged in spherical form, an adjacent outer cabin tube end enlarged in spherical form to engage the said inner cabin tube end, and means of water closure of the said universal joint consisting of a stuffing box construction for the said outer cabin tube end, substantially as specified.

10. In a two hull aeroship or similar craft, enclosed cabins of tubular formation mounted on the said hulls, transverse partitions for the said cabin tubes, doors for the said transverse partitions and means of water closure for the said doors, substantially as specified.

11. In a two hull aeroship or similar craft, enclosed cabins of tubular formation mounted on the said hulls, transverse partitions for the said cabin tubes, flexible doors for the said transverse partitions, a revolvable drum disposed beneath the cabin floor to engage the said flexible door, and means for water closure of the said flexible door, substantially as specified.

12. In a two hull aeroship or similar craft, enclosed cabins of tubular formation mounted on the said hulls, transverse partitions for the said cabin tubes, flexible doors for the said transverse partitions, means of opening and closing the said flexible doors consisting of a handwheel mounted on the said partition, a windlass secured to the said handwheel, ropes engaging the said windlass and secured to the upper and lower ends of the said flexible door, idler pulleys for the said ropes, and means for water closure of the said flexible doors, substantially as specified.

13. In a two hull aeroship or similar craft, enclosed cabins of tubular formation mounted on the said hulls, transverse partitions for the said cabin tubes, flexible doors of elastic material for the said transverse partitions and means of water closure for the said flexible doors, consisting of handwheels and mechanism arranged to clamp the said flexible doors to the said partitions around the entire periphery of the door openings of the said flexible doors, substantially as specified.

14. In a two hull aeroship or similar craft, enclosed cabins of tubular formation mounted on the said hulls, transverse partitions for the said cabin tubes, flexible doors of elastic material for the said transverse partitions and means of water closure of the said flexible doors, the said means comprising handwheels with threaded hub bores, eyebolts pivotally mounted on the said partitions, the said eye bolts having threaded portions in engagement with the threaded hubs of the said handwheels, clamping bars pivotally mounted on the said partitions and engaged by the said handwheels to clamp the said flexible doors to the said partitions at the tops and sides of the said flexible doors, substantially as specified.

15. In a two hull unit aeroship or similar craft, enclosed cabins of tubular formation mounted on the said hulls, transverse partitions for the said cabin tubes, flexible doors of elastic material for the said transverse partitions and means of water closure of the said flexible doors at the door sills, the said means comprising handwheels carried by vertical shafts mounted on the side walls of the said partitions adjacent to the said partitions, bevel driving gears carried by the said vertical shafts below the cabin floor, horizontal rods positioned below the cabin floor, the said horizontal rods having threaded portions and constrained against rotary motion, bevel driven gears mounted beneath the cabin floor to mesh with the said driving gears and having threaded bores to engage the threaded portions of the said horizontal rods, horizontal clamping bars pivotally mounted below the cabin floor adjacent to the said flexible doors, levers pivotally mounted for rotation in planes of said horizontal shafts, link connections between the said horizontal rods and the said levers and link connections between the said levers and the said clamping bars, whereby clockwise rotation of handwheels clamps the said flexible doors against the said partitions and counterclockwise rotation of said handwheels releases the said flexible doors at the door sills substantially as specified.

16. In a two hull aeroship or similar craft, enclosed cabins mounted on the said hulls at upper and lower levels, enclosed stairways between the said upper and lower cabins, means of closure of the said enclosed stairways to the said upper cabins, the said means consisting of a floor door of car construction arranged to run back under the floor of the said cabin to open the said floor door and to run forward to close the opening of the said cabin floor at the said stairway, substantially as specified.

17. In a two hull aeroship or similar craft, enclosed cabins mounted on the said hulls at upper and lower levels, enclosed stairways between the said upper and lower cabins, means of closure of the said enclosed stairways to the said upper cabins, the said means consisting of a floor door of car construction, and means for moving the said floor door to open or closed position, the second means comprising a handwheel, a windlass secured to the said handwheel, ropes engaging the said windlass and fastened to the forward and rear ends of the said floor doors, whereby clockwise rotation of the handwheels close the said floor doors and counterclockwise rotation of the said handwheels opens the said floor doors substantially as specified.

18. In a two hull aeroship or similar craft, enclosed cabins mounted on the said hulls at upper and lower levels, enclosed stairways between the said upper and lower cabins, means of closure of the said stairway openings to the said upper cabins consisting of floor doors of car construction running on tracks below the floors of the said upper cabins, and means of water closure of the said floor doors when in closed position covering the said stairway openings, substantially as specified.

19. In a two hull aeroship or similar craft, enclosed cabins mounted on the said hulls at upper and lower levels, enclosed stairways between the said upper and lower cabins, means of closure of the said stairway openings to the said upper cabins comprising floor doors of car construction to run on tracks below the floors of the said upper cabins and means of water closure of the said floor doors when in closed position over the said stairway openings, the said second means consisting of hand operated mechanism to raise the said floors to engagement with the floors of the said upper cabins around the periphery of the said stairway openings substantially as specified.

20. In a two hull aeroship or similar craft, enclosed cabins mounted on the said hulls at upper and lower levels, enclosed stairways between the said upper and lower cabins, means of closure of the openings of the said enclosed stairways to the said upper cabins consisting of floor doors of car construction, top plates for the said floor doors larger than the said stairway openings and underlapping the said upper cabin floors around the entire periphery of the said stairway openings, and means of water closure for the said stairway openings, the said second means comprising vertical shafts mounted on the cabin sides and floors adjacent to the said stairway openings, handwheels carried by the said vertical shafts above the cabin floors, driving bevel gears carried by the said vertical shafts below the cabin floors, driven bevel gears with journal projections having threaded openings and mounted below the cabin floors for rotation about horizontal axes, horizontal rods having threaded portions engaging the said threaded openings of the said driven bevel gears, the said horizontal rods having square portions at the outer ends and round portions at the inner ends, bearings having square openings mounted on the side walls of the said cabin tubes engaging the said square portions of the said horizontal rods to prevent rotation of the said rods, bearings having stuffing boxes and round openings mounted on the side walls of the said enclosed stairways engaging the said round portions of the said horizontal rods, bell cranks mounted on the said stairway side walls positioned to engage the ends of the said horizontal rods, and stiffening brackets at the sides and ends of the said floor doors constituting the said lap of the said floor doors under the said cabin floors, the said brackets engaged by the said bell cranks to raise the said floor doors to engagement with the said cabin floors to effect water tight joints, substantially as specified.

Signed at Elyria, in the county of Lorain and State of Ohio, this 28th day of February 1931.

SAMUEL E. HITT.